(12) United States Patent
Niwa et al.

(10) Patent No.: US 8,655,576 B2
(45) Date of Patent: Feb. 18, 2014

(54) FUEL-SAVING DRIVE RECOMMENDATION SYSTEM AND FUEL-SAVING DRIVE RECOMMENDATION METHOD

(75) Inventors: Kenji Niwa, Nagoya (JP); Hiroyuki Sawada, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/266,143

(22) PCT Filed: Apr. 13, 2010

(86) PCT No.: PCT/IB2010/000807
§ 371 (c)(1),
(2), (4) Date: Oct. 25, 2011

(87) PCT Pub. No.: WO2010/136858
PCT Pub. Date: Dec. 2, 2010

(65) Prior Publication Data
US 2012/0059561 A1    Mar. 8, 2012

(30) Foreign Application Priority Data
May 29, 2009    (JP) .................................. 2009-130893

(51) Int. Cl.
G06F 19/00    (2011.01)
(52) U.S. Cl.
USPC .......................................................... 701/123
(58) Field of Classification Search
USPC ....................................... 701/22, 51, 54, 123
See application file for complete search history.

(56) References Cited

U.S. PATENT DOCUMENTS

| | | | |
|---|---|---|---|
| 4,494,404 A * | 1/1985 | Strifler | 73/114.52 |
| 2007/0296567 A1 | 12/2007 | Tamai et al. | |
| 2010/0151988 A1* | 6/2010 | Tabata et al. | 477/3 |

FOREIGN PATENT DOCUMENTS

| | | |
|---|---|---|
| EP | 1 826 461 A1 | 8/2007 |
| JP | 2007-138926 | 6/2007 |
| JP | 2010-71356 | 4/2010 |

OTHER PUBLICATIONS

International Search Report in International Application No. PCT/IB2010/000807; Mailing Date: May 27, 2011.
Written Opinion of the International Searching Authority in International Application No. PCT/IB2010/000807; Mailing Date: May 27, 2011.

* cited by examiner

*Primary Examiner* — Kim T Nguyen
(74) *Attorney, Agent, or Firm* — Finnegan, Henderson, Farabow, Garrett & Dunner, LLP (57) ABSTRACT

A fuel-saving drive recommendation system is mounted on a vehicle that includes a step-gear automatic transmission of which a gear is shifted in response to a gear instruction signal. The fuel-saving drive recommendation system calculates a required driving force based on an amount by which an output operating component is operated by a driver and a gear of the automatic transmission, makes determination for fuel-saving drive for the vehicle based on the required driving force and notifies the determination result. The fuel-saving drive recommendation system calculates a required driving force for performing output control on an engine and a required driving force for determining whether it is a fuel-saving drive state. A determination gear signal different from the gear instruction signal is used when the determination required driving force is calculated, and is changed to coincide with the gear instruction signal that has been changed.

7 Claims, 7 Drawing Sheets

FUEL-SAVING DRIVE RECOMMENDATION SYSTEM AND FUEL-SAVING DRIVE RECOMMENDATION METHOD

CROSS-REFERENCE TO RELATED APPLICATIONS

This application is a national phase application of International Application No. PCT/IB2010/000807, filed Apr. 13, 2010, and claims the priority of Japanese Application No. 2009-130893, filed May 29, 2009, the contents of both of which are incorporated herein by reference.

BACKGROUND OF THE INVENTION

1. Field of the Invention

The invention relates to a fuel-saving drive recommendation system mounted on a vehicle equipped with a step-gear automatic transmission, and also to a fuel-saving drive recommendation method.

2. Description of the Related Art

Some of vehicles in recent years include a fuel-saving drive recommendation system described in Japanese Patent Application Publication No. 2007-138926 (JP-A-2007-138926). In the fuel-saving drive recommendation system described in JP-A-2007-138926, a recommended region for fuel-saving drive is set on the basis of various parameters, such as engine rotational speed, intake air flow rate, vehicle speed and accelerator operation amount, and, when the actual running state of the vehicle falls within the recommended region, a lamp is turned on to notify the driver that the fuel-saving drive is achieved. On the other hand, when the actual running state of the vehicle falls outside the recommended region, the lamp is turned off to notify the driver that the actual running state deviates from fuel-saving drive.

In addition, another fuel-saving drive recommendation system calculates a required driving force required for a vehicle and then determines whether the running state of the vehicle is a fuel-saving drive state on the basis of whether the calculated required driving force falls within a recommended region for fuel-saving drive. Then, such a fuel-saving drive recommendation system also notifies the driver of the result of determination in turning on or off of a lamp. Note that another fuel-saving drive recommendation system notifies a driver in bar indication, instead of notifying the driver of the result of determination as to whether the running state of the vehicle is a fuel-saving drive state in turning on or off of a lamp.

In the fuel-saving drive recommendation system described in JP-A-2007-138926, the above described parameters are used as parameters for determining whether the running state of the vehicle is appropriate for fuel saving.

On the other hand, some of vehicles in recent years employ so-called torque demand control. In the torque demand control, a required driving force of a vehicle driver is calculated to control engine output, or the like. To calculate such a required driving force, the speed ratio of a transmission, or the like, is also considered in addition to the above parameters. Therefore, the required driving force becomes a value that further conforms to engine output, that is, fuel consumption. Then, the required driving force is used as a parameter for determining whether the running state is suitable for fuel saving to thereby make it possible to further improve determination accuracy for fuel saving.

Incidentally, in the case of a step-gear automatic transmission, when the automatic transmission is in a low gear and the speed ratio (input shaft rotational speed/output shaft rotational speed) is high, driving force transmitted to a wheel side increases, so a margin of driving force increases. On the other hand, when the automatic transmission is in a high gear and the speed ratio is low, driving force transmitted to the wheel side decreases, so a margin of driving force decreases. For the above reasons, in the case of the step-gear automatic transmission, a difference in required driving force is set gear by gear, and a required driving force also varies as the gear is shifted. Therefore, when the above required driving force is used as a determination parameter in a fuel-saving drive recommendation system mounted on a vehicle equipped for a step-gear automatic transmission, there is a possibility that a driver experiences an uncomfortable feeling when the gear is shifted because of the following reasons, for example.

First, in the step-gear automatic transmission, when a gear instruction signal for shifting gears is changed, hydraulic pressures applied to a clutch and a brake are switched, so the engine rotational speed is regulated so that the input shaft rotational speed of the transmission becomes a rotational speed (synchronous speed) corresponding to the post-shift speed ratio. Thus, there is a certain delay from when the gear instruction signal is changed to when the actual engine rotational speed varies.

Here, when the gear instruction signal is changed as described above, the required driving force also varies, so the result of determination for fuel-saving drive also changes at the time when the gear instruction signal is changed. However, as described above, there is a certain delay from when the gear instruction signal is changed to when the actual engine rotational speed varies. In this case, the result of determination for fuel-saving drive changes ahead before the input shaft rotational speed of the transmission begins to vary, that is, before the engine rotational speed begins to vary. Therefore, the driver is notified of the result of determination for fuel-saving drive ahead before the driver experiences a variation in engine rotational speed, so there is a possibility that the driver experiences an uncomfortable feeling.

SUMMARY OF THE INVENTION

The invention provides a fuel-saving drive recommendation system and fuel-saving drive recommendation method that determine whether a vehicle is in a fuel-saving drive state on the basis of a required driving force and that are able to suppress an uncomfortable feeling experienced by a driver when an automatic transmission shifts gears.

A first aspect of the invention provides a fuel-saving drive recommendation system adapted to a vehicle that includes a step-gear automatic transmission of which a gear is shifted in response to a gear instruction signal and an internal combustion engine on which output control is performed on the basis of a required driving force that is calculated on the basis of an amount by which an output operating component is operated by a driver and a variable gear of the automatic transmission. The fuel-saving drive recommendation system includes: a required driving force calculation unit that calculates, as the required driving force, an output control required driving force for performing output control on the engine and a determination required driving force for determining whether the vehicle is in a fuel-saving drive state, wherein the required driving force calculation unit uses the gear instruction signal as a parameter that indicates the gear when the output control required driving force is calculated, and uses a determination gear signal different from the gear instruction signal when the determination required driving force is calculated; a signal change unit that changes the determination gear signal so as to coincide with the gear instruction signal that has been changed; a determination unit that determines whether a running state of the vehicle is a fuel-saving drive state on the basis of the determination required driving force; and a notification unit that notifies a result of the determination.

In the first aspect of the invention, in addition to the output control required driving force for performing output control on the engine, the determination required driving force for determining whether it is a fuel-saving drive state is separately calculated as the required driving force. Then, the gear instruction signal that is an instruction value for changing the gear is used as a parameter that indicates the gear necessary for calculating the output control required driving force. Thus, it is possible to regulate the engine rotational speed in order to regulate the input shaft rotational speed of the automatic transmission in accordance with a start of shift.

On the other hand, the determination gear signal different from the gear instruction signal is used as a parameter that indicates the gear necessary for calculating the determination required driving force. The determination gear signal is changed after a certain delay period so as to coincide with the gear instruction signal that has been changed. Thus, after the gear instruction signal is changed, the determination gear signal is changed after a delay. Thus, when the automatic transmission shifts gears, first, the output control required driving force initially varies and then the determination required driving force also varies after a delay. Therefore, the determination required driving force, which is the required driving force for determining whether it is a fuel-saving drive state, may be varied after the gear instruction signal is changed and then the input shaft rotational speed of the transmission begins to vary, that is, after the engine rotational speed begins to vary. Thus, after the engine rotational speed begins to vary, the result of determination for fuel-saving drive changes. By so doing, it is possible to suppress an uncomfortable feeling experienced by the driver when the automatic transmission shifts gears.

Incidentally, the output operating component may be, for example, an accelerator pedal. In the above configuration, the signal change unit may change the determination gear signal on the basis of the progress of shift during shifting of the automatic transmission.

The engine rotational speed varies with the progress of shift during shifting of the automatic transmission. In the above configuration, the determination gear signal is changed on the basis of the progress of shift. Thus, it is possible to favorably change the determination gear signal.

In the above configuration, the fuel-saving drive recommendation system may further include: an input shaft rotational speed detecting unit that detects an input shaft rotational speed of the automatic transmission; a synchronous speed calculation unit that calculates a synchronous speed of the input shaft rotational speed, corresponding to a post-shift gear, when the automatic transmission shifts gears; and a shift progress calculation unit that calculates a degree to which the input shaft rotational speed detected during shifting of the automatic transmission reaches the synchronous speed as the progress of shift of the automatic transmission, wherein the signal change unit may change the determination gear signal on the basis of the progress of shift calculated by the shift progress calculation unit.

The progress of shift may be estimated on the basis of an elapsed time from when the gear instruction signal is changed. However, an automatic transmission in recent years has various modes, such as a power mode in which shift control that places importance on driving force is performed and an economy mode in which shift control that places importance on fuel economy is performed. In the automatic transmission in which shift modes are switched in this way, a movement of the input shaft rotational speed of the automatic transmission in a period from when the gear instruction signal is changed to when a shift is completed is not uniform but different between shift modes. In addition, a movement of the input shaft rotational speed also varies because of aged degradation of the automatic transmission, or the like. Therefore, when the progress of shift is estimated on the basis of the elapsed time, there is a possibility that the input shaft rotational speed of the automatic transmission at the time when the determination gear signal is changed varies by shift modes or deviates because of aged degradation, or the like.

In terms of this point, in the above configuration, a degree to which an actual input shaft rotational speed reaches the synchronous speed is calculated as the progress of shift, and the determination gear signal is changed on the basis of the calculated progress of shift. Therefore, it is possible to suppress the influence of the above described shift modes, aged degradation, or the like, on the input shaft rotational speed of the automatic transmission as much as possible when the determination gear signal is changed. Thus, when the result of determination for fuel-saving drive changes with a change of the determination gear signal, the input shaft rotational speed at the time when the result of determination changes is almost constant. By so doing, it is possible to stably suppress an uncomfortable feeling experienced by the driver.

In the above configuration, the shift progress calculation unit may calculate a first speed difference that is a difference between the input shaft rotational speed at the start of a shift and an actual value of the input shaft rotational speed during shifting, may calculate a second speed difference that is a difference between the input shaft rotational speed at the start of a shift and the synchronous speed at the end of a shift, and may calculate the proportion of the first speed difference to the second speed difference as the progress of shift, and the signal change unit may change the determination gear signal when the progress of shift has reached a predetermined determination value.

The progress of shift that indicates a degree to which the actual input shaft rotational speed reaches the synchronous speed may be calculated as described above. That is, by calculating the first speed difference, a variation in input shaft rotational speed from the start of a shift to a current point in time is calculated. In addition, by calculating the second speed difference, a variation in input shaft rotational speed from the start of a shift to the end of a shift is calculated. Thus, it is possible to obtain the progress of shift by calculating the proportion of the first speed difference to the second speed difference.

Then, by changing the determination gear signal at the time when the calculated progress of shift has reached a predetermined determination value, it is possible to appropriately change the determination gear signal. Incidentally, in the above configuration, various calculation modes may be employed to calculate the proportion of the first speed difference to the second speed difference. For example, a value that is obtained by subtracting the first speed difference from the second speed difference (second speed difference B–first speed difference A) may be set as that proportion. In this case, the calculated proportion decreases as the progress of shift increases. In addition, the ratio of the first speed difference to the second speed difference (first speed difference/second speed difference) may be set as that proportion. In this case, the calculated proportion increases as the progress of shift increases (the progress of shift is "0" immediately before the start of a shift, and increases with the progress of shift, and then finally becomes "1" at the end of a shift).

In addition, in the above configuration, it is possible to regulate the timing, at which the determination gear signal is changed, only by changing the determination value, so it is possible to easily optimize the change timing or expand and employ the change timing to other vehicle types.

In the above configuration, the fuel-saving drive recommendation system may further include: a measuring unit that measures an elapsed time from when the gear instruction signal is changed, wherein the signal change unit may change the determination gear signal on the basis of the elapsed time measured by the measuring unit.

As described above, the progress of shift may be estimated on the basis of an elapsed time from when the gear instruction signal is changed. In this case, the process for changing the determination gear signal may be formed of a further simple configuration.

In the above configuration, the signal change unit may change the determination gear signal when a shift stage of the automatic transmission is in an inertia phase.

With the above configuration, the determination gear signal is changed when the shift stage of the automatic transmission is in an inertia phase, that is, when the input shaft rotational speed of the automatic transmission is varying with shift operation. Thus, the determination gear signal is changed at the time when the driver can recognize a variation in engine rotational speed, so it is possible to change the result of determination for fuel-saving drive at an appropriate timing. Incidentally, the inertia phase is formed in response to an instruction signal from a controller that controls a shift of the automatic transmission. Therefore, the above instruction signal is input to the fuel-saving drive recommendation system. By so doing, it is possible to easily determine whether the shift stage is in an inertia phase.

A second aspect of the invention provides a fuel-saving drive recommendation method adapted to a vehicle that includes a step-gear automatic transmission of which a gear is shifted in response to a gear instruction signal and an internal combustion engine on which output control is performed on the basis of a required driving force that is calculated on the basis of an amount by which an output operating component is operated by a driver and a variable gear of the automatic transmission. The fuel-saving drive recommendation method includes: calculating, as the required driving force, an output control required driving force for performing output control on the engine and a determination required driving force for determining whether the vehicle is in a fuel-saving drive state, wherein the gear instruction signal is used as a parameter that indicates the gear when the output control required driving force is calculated, and a determination gear signal different from the gear instruction signal is used when the determination required driving force is calculated; changing the determination gear signal so as to coincide with the gear instruction signal that has been changed; determining whether a running state of the vehicle is a fuel-saving drive state on the basis of the determination required driving force; and notifying a result of the determination.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment of the invention will be described with reference to FIG. 1 to FIG. 6D. A fuel-saving drive recommendation system 11 mounted on a vehicle mainly includes an engine control electronic control unit (hereinafter, referred to as engine control ECU) 13 and a transmission electronic control unit (hereinafter, referred to as shift control ECU) 15. The engine control ECU 13 controls an engine 12 mounted on the vehicle. The shift control ECU 15 controls the shift of a step-gear automatic transmission (hereinafter, referred to as transmission) 14. An eco indicator determination unit 17 is constructed in the engine control ECU 13. The eco indicator determination unit 17 controls a display device 16. Then, the engine control ECU 13, the shift control ECU 15 and the display device 16 are communicably connected to one another via an in-vehicle network. Note that the transmission 14 is coupled to the engine 12 via a torque converter (not shown). The transmission 14 is configured so that solenoid valves in a hydraulic pressure control circuit 18 are controlled to select any one of a plurality of gears. In addition, the transmission 14 has six gears, that is, a first gear to a sixth gear, as forward running gears.

Figure 1:
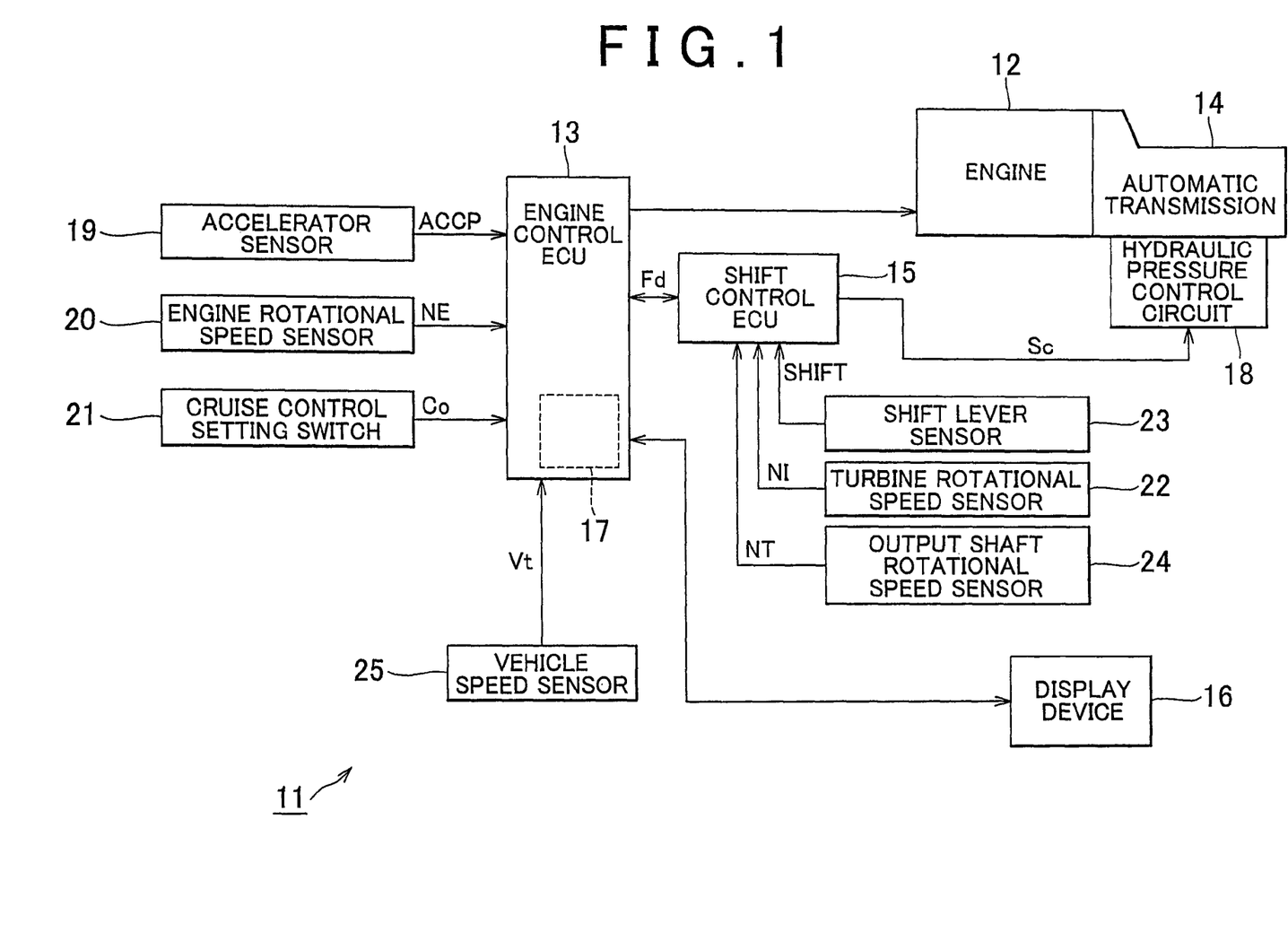
FIG. 1 is a schematic view that shows the configuration of a vehicle to which a fuel-saving drive recommendation system according to an embodiment of the invention is applied.

The vehicle is provided with, for example, the following components as various sensors and switches. First, the vehicle has an accelerator sensor 19 that detects an accelerator operation amount ACCP. The accelerator operation amount ACCP is an amount by which an accelerator pedal is depressed. Note that in the present embodiment, the accelerator pedal constitutes an output operating component according to the aspect of the invention. In addition, the vehicle has an engine rotational speed sensor 20 that detects the engine rotational speed of the engine 12. In addition, the vehicle has a cruise control setting switch 21 that outputs a cruise control request Co to the engine control ECU 13 through driver's operation. Note that, as the cruise control setting switch 21 outputs the cruise control request Co to the engine control ECU 13, cruise control is executed. In the cruise control, the vehicle is driven while keeping a vehicle speed at constant. In addition, the vehicle has a turbine rotational speed sensor 22, an output shaft rotational speed sensor 24, a shift lever sensor 23, and the like. The turbine rotational speed sensor 22, which serves as an input shaft rotational speed detecting unit, detects the turbine rotational speed NI of the torque converter, that is, the input shaft rotational speed of the transmission 14. The output shaft rotational speed sensor 24 detects the output shaft rotational speed NT of the transmission 14. The shift lever sensor 23 detects the shift lever position SHIFT of the transmission. Then, the vehicle has a vehicle speed sensor 25 that detects the rotational speed of a wheel of the vehicle, and a vehicle speed Vt is detected by the vehicle speed sensor 25.

The engine control ECU 13 includes a central processing unit (CPU), a read only memory (ROM) that store programs and data for control, a random access memory (RAM) that stores computation results, and the like, input/output ports for inputting and outputting signals, and the like. In the engine control ECU 13, predetermined computing processes are executed in the CPU in accordance with the programs stored in the ROM. Various sensors and switches, such as the accelerator sensor 19, the engine rotational speed sensor 20, the vehicle speed sensor 25 and the cruise control setting switch 21, are connected to the engine control ECU 13. Then, the engine control ECU 13 executes various controls on the engine 12 on the basis of the detected results obtained from various sensors, and the like, and switches the execution mode of each of various controls on the basis of a driving mode M selected by driver's switch operation. For example, engine output control that is balanced in terms of driving force and fuel economy is performed when a normal mode is selected as the driving mode M, engine output control that places importance on driving force is performed when a power mode is selected, and engine output control that places importance on low fuel economy is performed when an economy mode is selected.

In addition, the engine control ECU 13 calculates a required driving force of the vehicle driver to perform so-called torque demand control as engine output control so as to obtain the required driving force. In the torque demand control, an output control required driving force Fd is basically calculated on the basis of a gear instruction signal Sc, and the like (described later), which is a parameter that indicates the accelerator operation amount ACCP, the engine rotational speed NE and the current gear, and then the intake air flow rate and fuel injection flow rate of the engine are regulated so as to obtain the output control required driving force Fd.

Note that, in the transmission 14, when the transmission 14 is in a low gear and the speed ratio (input shaft rotational speed/output shaft rotational speed) is high, driving force transmitted to a wheel side increases, so a margin of driving force increases. On the other hand, when the transmission 14 is in a high gear and the speed ratio is low, driving force transmitted to the wheel side decreases, so a margin of driving force decreases. For the above reasons, the output control required driving force Fd is varied gear by gear. For example, when the transmission 14 is in a low gear, a margin of driving force increases, so the output control required driving force Fd is relatively reduced. On the other hand, when the transmission 14 is in a high gear, a margin of driving force decreases, so the output control required driving force Fd is relatively increased.

The shift control ECU 15 also includes a CPU, a ROM, a RAM, and the like, and predetermined computing processes are executed in the CPU in accordance with programs stored in the ROM. In addition, various sensors that detect the running condition of the vehicle and the operating condition of the engine 12 are connected to the shift control ECU 15. The various sensors include the turbine rotational speed sensor 22, the shift lever sensor 23, the output shaft rotational speed sensor 24, and the like. In addition, signals for detecting data necessary for controlling the transmission 14 are also input to the shift control ECU 15 via the engine control ECU 13. The data include the accelerator operation amount ACCP, the engine rotational speed NE, the vehicle speed Vt, or the like.

The shift control ECU 15 controls the solenoid valves provided in the hydraulic pressure control circuit 18 of the transmission 14 to operate the engage states of the clutch mechanism and brake mechanism in the transmission 14. By so doing, the transmission 14 is controlled to establish a gear appropriate for the running state of the vehicle. More specifically, the shift control ECU 15 determines an appropriate gear on the basis of the accelerator operation amount ACCP, the vehicle speed Vt, and the like, by referring to a shift line map stored in the ROM, and inputs the gear instruction signal Sc corresponding to that gear to the solenoid valves provided in the hydraulic pressure control circuit 18, thus performing control over a shift of gear. Note that values from "1" to "6" are prepared as forward gear instruction signals Sc.

In addition, the shift control ECU 15 changes the shift line map on the basis of the driving mode M to thereby set gears corresponding to each mode. For example, the shift line map is changed in such a manner that, with reference to a state where the normal mode is selected, a lower gear tends to be selected when the power mode is selected and a higher gear tends to be selected when the economy mode is selected.

Furthermore, the shift control ECU 15 varies the operating speeds of the clutch mechanism and brake mechanism during shift operation on the basis of the driving mode M. For example, the operating speeds of the clutch mechanism and brake mechanism are increased in order to place importance on a reduction in shift time when the power mode is selected, and the operating speeds of the clutch mechanism and brake mechanism are reduced as compared with that when the power mode is selected in order to place importance on suppression of shift shock when the economy mode is selected.

Figure 2A:
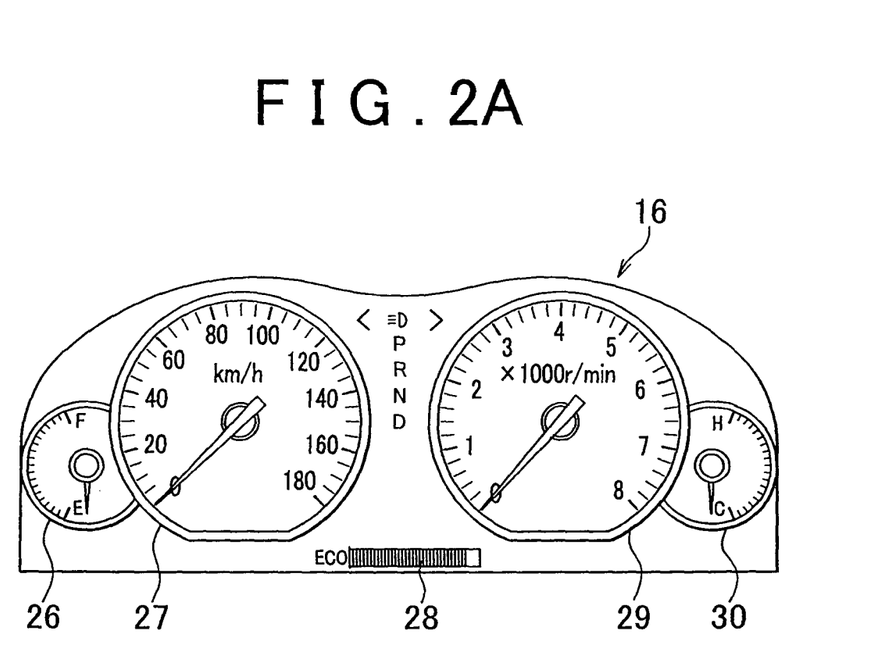
FIG. 2A is a front view of a display device.
Figure 2B:
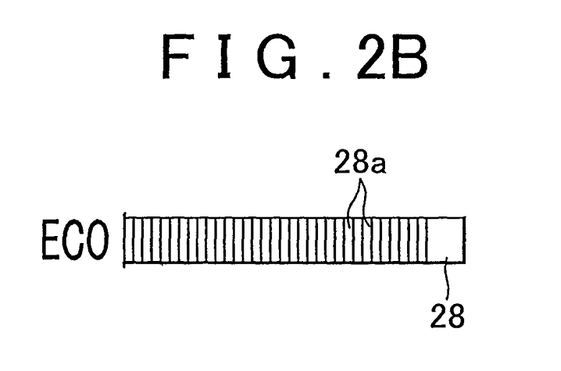
FIG. 2B is an enlarged view of a display unit.

The eco indicator determination unit 17 determines whether the current running state of the vehicle is a fuel-saving drive state on the basis of the engine operating state, the running state of the vehicle, and the like. Then, a result of the determination is output to the display device 16. As shown in FIG. 2A, the display device 16 is provided in an instrument panel (not shown) at the front in a vehicle cabin. The display device 16 includes a residual fuel meter 26, a speedometer 27, a display unit 28, a tachometer 29, a coolant temperature meter 30, and the like. Then, as shown in FIG. 2B, the display unit 28 is divided into a large number of segments 28a, and the segments 28a are arranged in a bar-like shape. Each segment 28a is configured to turn on or off by a signal from the eco indicator determination unit 17.

Figure 3:
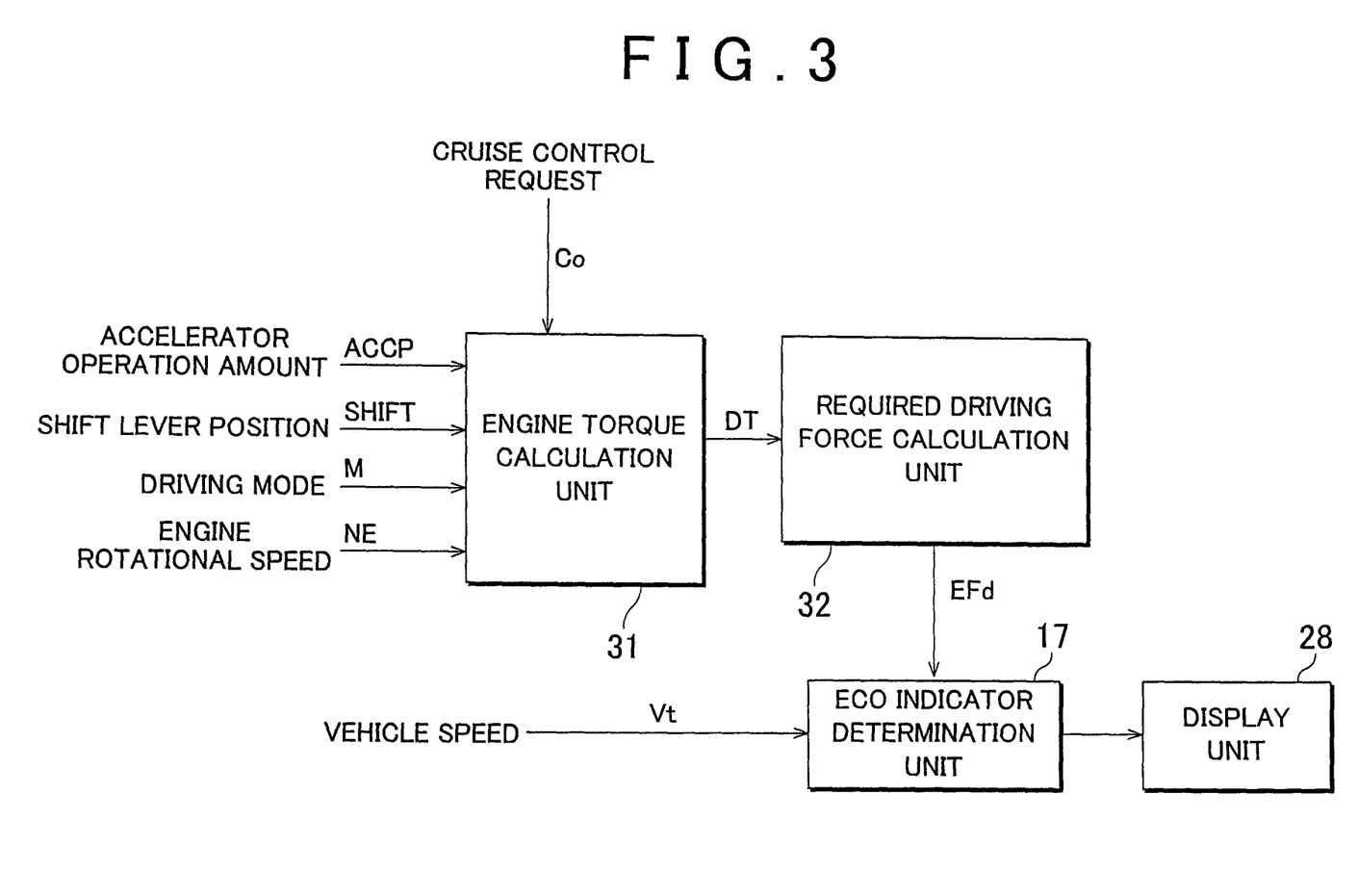
FIG. 3 is a block diagram that shows the configuration of the fuel-saving drive recommendation system.

FIG. 3 shows a block diagram of the fuel-saving drive recommendation system 11 that includes the engine control ECU 13, the shift control ECU 15, the eco indicator determination unit 17 and the display unit 28. In an engine torque calculation unit 31 shown in FIG. 3, a driver demand torque DT, which is an engine torque corresponding to a driver's request, is calculated on the basis of the accelerator operation amount ACCP, the shift lever position SHIFT, the cruise control request Co, the driving mode M, the engine rotational speed NE, and the like. Then, the driver demand torque DT calculated in the engine torque calculation unit 31 is output to a required driving force calculation unit 32.

In the required driving force calculation unit 32, a required driving force, which is a driving force of the vehicle corresponding to a driver's request, is calculated on the basis of the driver demand torque DT, the driving efficiency of a region from the engine 12 to the wheels, the gear of the transmission 14, and the like. The required driving force calculation unit 32 calculates, as the required driving force, the output control required driving force Fd for performing output control on the engine and the determination required driving force EFd for determining whether the running state of the vehicle is a fuel-saving drive state.

To calculate the output control required driving force Fd, the gear instruction signal Sc is used as a parameter that indicates the gear of the transmission 14. On the other hand, to calculate the determination required driving force EFd, a determination gear signal ESc different from the gear instruction signal Sc is used as a parameter that indicates the gear of the transmission 14. A mode of setting the determination gear signal ESc will be described later.

The determination required driving force EFd calculated in the required driving force calculation unit 32 is output to the eco indicator determination unit 17. In the eco indicator determination unit 17, a required driving force recommendation region R that is optimal in view of fuel saving is calculated on the basis of the vehicle speed Vt. Then, when the determination required driving force EFd falls within the required driving force recommendation region R, all the segments 28a of the display unit 28 are turned on. On the other hand, when the determination required driving force EFd deviates from the required driving force recommendation region R, the segments 28a of the display unit 28 are partially or wholly turned off on the basis of the degree of the deviation. For example, when the degree of the deviation is high, the number of the segments 28a turned on is reduced so that a bar-like indication expressed by the segments 28a becomes short. In this way, the eco indicator determination unit 17 constantly makes determination for fuel-saving drive while the vehicle is running, and controls turning on or off of the segments 28a on the basis of a result of the determination. By so doing, the eco indicator determination unit 17 notifies the driver whether the current running state of the vehicle is a fuel-saving drive state.

Figure 4:
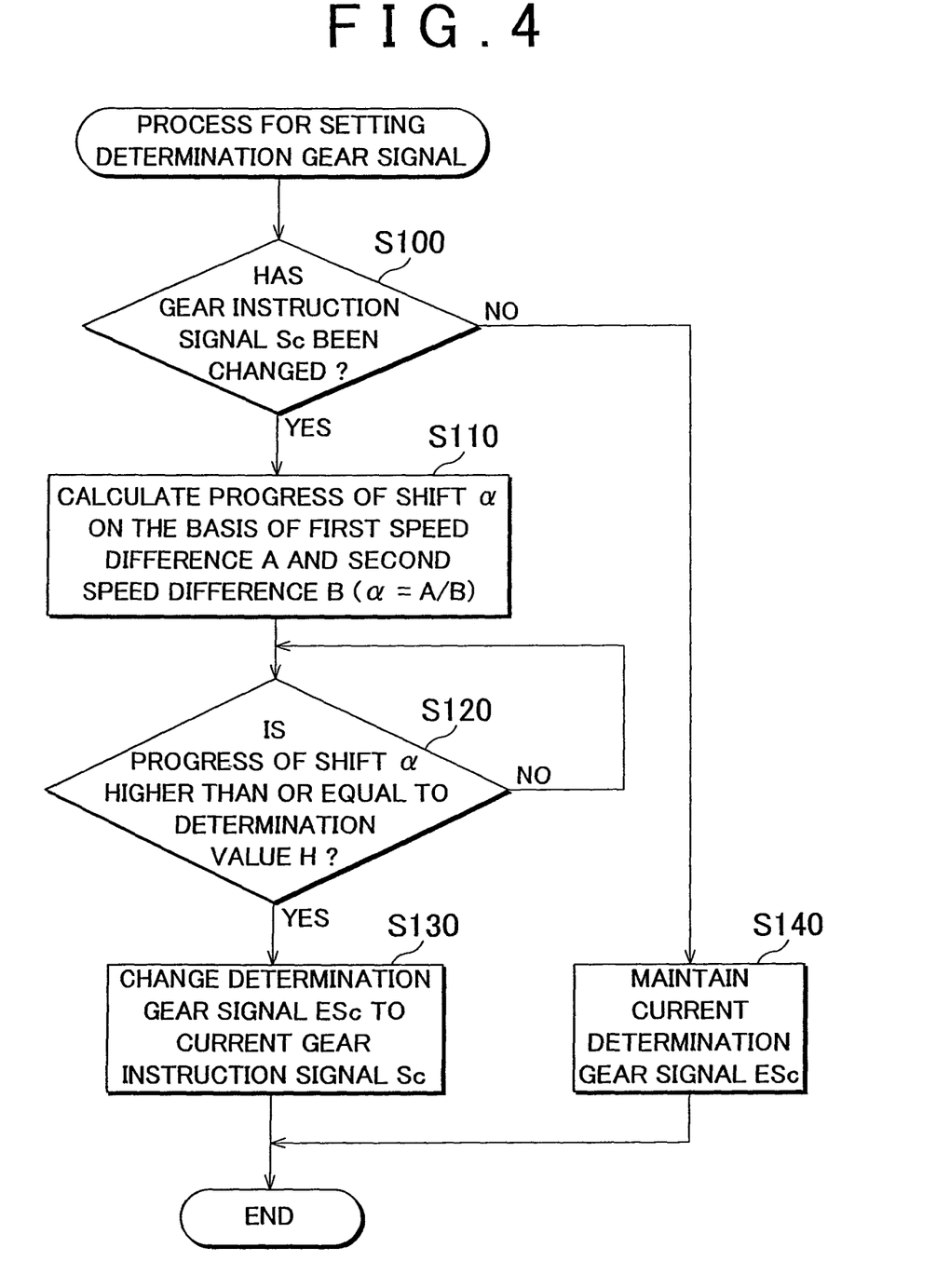
FIG. 4 is a flowchart that shows the procedure of process for setting a determination gear signal.

Next, the process for setting the determination gear signal ESc used to calculate the determination required driving force EFd will be described. FIG. 4 shows the procedure of process for setting the determination gear signal ESc. Note that the process is repeatedly executed by the eco indicator determination unit 17 (signal change unit) at a predetermined interval.

As the setting process is started, first, it is determined whether the gear instruction signal Sc has been changed (S100). Then, when the gear instruction signal Sc has not been changed, that is, when the transmission 14 is not shifting gears (NO in S100), the currently set determination gear signal ESc is maintained (S140), and then the process once ends.

On the other hand, when the gear instruction signal Sc has been changed, that is, when the shift operation of the transmission 14 is carried out (YES in S100), the progress of shift $\alpha$ is calculated from the following expression (1) on the basis of a first speed difference A and a second speed difference B (S110). Note that the process of S110 corresponds to the process executed by a shift progress calculation unit.

$$\alpha = A/B \quad (1)$$

The first speed difference A is a value obtained from the following expression (2).

$$A = NIs - NI \quad (2)$$

NIs is a shift-start turbine rotational speed, and NI is an actual value of a turbine rotational speed during shifting. The shift-start turbine rotational speed NIs is a turbine rotational speed NI at the start of a shift, and, more specifically, is a turbine rotational speed NI immediately before the turbine rotational speed NI begins to vary with shift operation. In other words, the shift-start turbine rotational speed NIs is a turbine rotational speed NI at the time when the shift stage of the transmission shifts into an inertia phase.

In addition, the second speed difference B is a value calculated from the following expression (3).

$$B = NIs - NId \quad (3)$$

NIs is a shift-start turbine rotational speed, and NId is a synchronous speed. The synchronous speed NId is a turbine rotational speed NI corresponding to a post-shift gear. The synchronous speed NId is calculated by the engine control ECU 13 when the gear instruction signal Sc is changed. Then, the engine control ECU 13 regulates the engine rotational speed NE in accordance with the progress of shift so that the shift-start turbine rotational speed NI varies toward the synchronous speed NId. Note that the engine control ECU 13 that calculates the synchronous speed NId constitutes a synchronous speed calculation unit according to the aspect of the invention.

By calculating the first speed difference A, a variation in turbine rotational speed NI from the start of a shift to a current point in time is calculated. In addition, by calculating the second speed difference B, a variation in turbine rotational speed NI from the start of a shift to the end of a shift is calculated in advance. Thus, by calculating the proportion (ratio) of the first speed difference A to the second speed difference B using the above expression (1), a degree to which the actual turbine rotational speed NI reaches the synchronous speed NId, that is, the progress of shift $\alpha$, which is the progress of shift during shifting of the transmission 14, is obtained.

Incidentally, the progress of shift $\alpha$ obtained by the expression (1) increases with an increase in the progress of shifting gears. That is, the progress of shift $\alpha$ is "0" immediately before the start of a shift, and increases with the progress of shifting gears, and then becomes "1" at the end of a shift finally.

When the progress of shift $\alpha$ is thus calculated, it is subsequently determined whether the progress of shift $\alpha$ is higher than or equal to a determination value H (S120). The determination value H is a value for determining whether the progress of shift $\alpha$ reaches a degree to which the driver can recognize a variation in engine rotational speed NE during shifting of the transmission 14. The determination value H is set through experiments, or the like, in advance.

Then, when the progress of shift $\alpha$ is lower than the determination value H (NO in S120), determination in step S120 is repeated until affirmative determination is made in step S120. On the other hand, when the progress of shift $\alpha$ is higher than or equal to the determination value H (YES in S120), it is determined that the progress of shift $\alpha$ has reached a degree to which the driver can recognize a variation in engine rotational speed NE during shifting of the transmission 14.

Then, the determination gear signal ESc is changed to the currently set gear instruction signal Sc, that is, the same value as the gear instruction signal Sc that is determined to have been changed in step S100 (S130), and then the process once ends.

Next, a mode of changing the determination gear signal ESc by the fuel-saving drive recommendation system 11 according to the present embodiment will be described with reference to the timing charts illustrated in FIG. 5A to FIG. 5D and FIG. 6A to FIG. 6D. Note that FIG. 5A to FIG. 5D show a mode when the transmission 14 upshifts from the second gear to the third gear, and FIG. 6A to FIG. 6D show a mode when the transmission 14 downshifts from the third gear to the second gear.

Figure 5A:
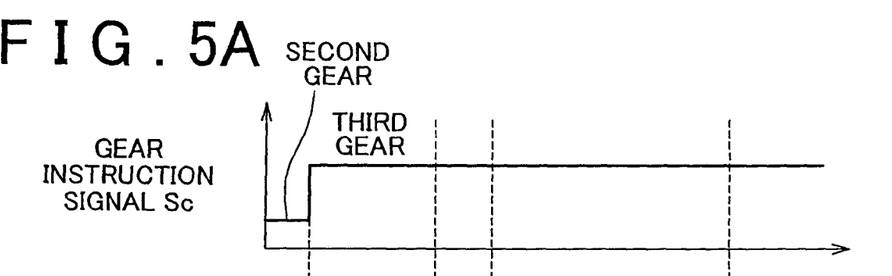
FIG. 5A to FIG. 5D are time charts that show an example of a control mode of the fuel-saving drive recommendation system when the automatic transmission upshifts.
Figure 5B:
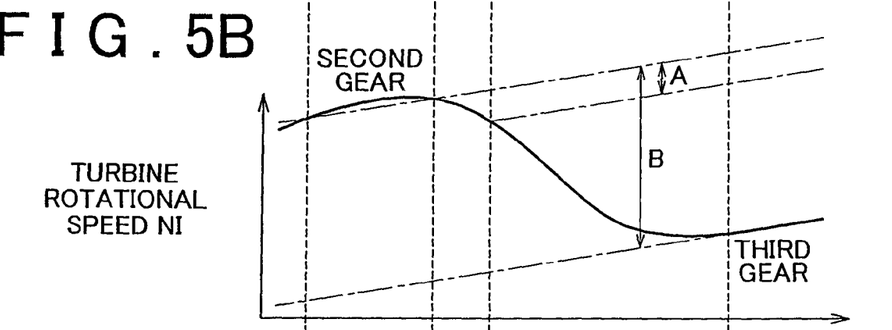
Figure 5C:
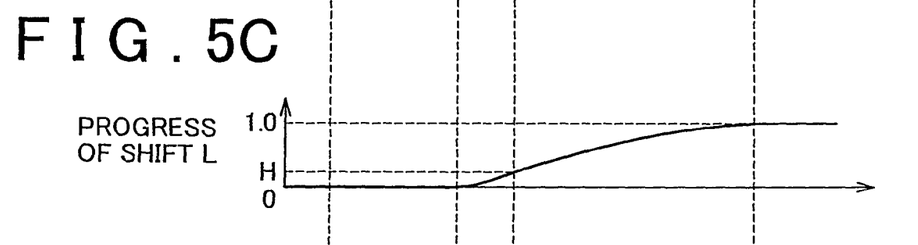
Figure 5D:
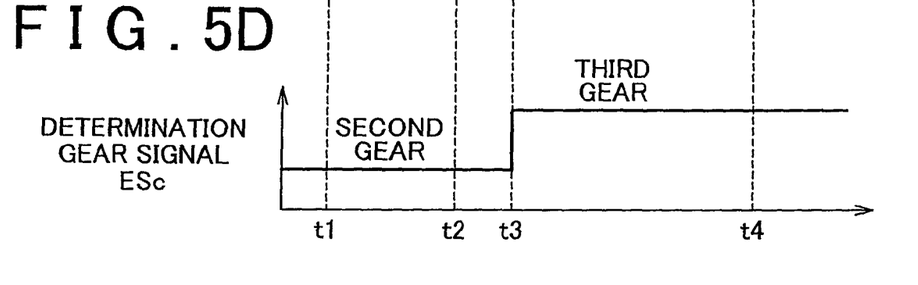

First, as shown in FIG. 5A, when the gear instruction signal Sc is changed from the second gear to the third gear (time t1), shift operation of the transmission 14 is started, and the clutch mechanism and brake mechanism of the transmission 14 are operated to start establishing the post-shift gear. After that, at time t2, the engine rotational speed NE is started to be regulated in order to make the pre-shift turbine rotational speed NI coincide with the synchronous speed NId corresponding to the post-shift third gear. Thus, the turbine rotational speed NI gradually decreases. When the turbine rotational speed NI reaches the synchronous speed NId at time t4, the shift is completed. During a period from time t2 to time t4, the first speed difference A gradually increases with a decrease in turbine rotational speed NI, and the progress of shift α also gradually increases. Then, in a period from time t2 to time t4, when the progress of shift α reaches the determination value H (time t3), it is determined that the engine rotational speed NE has changed by a degree to which the driver can recognize a variation in engine rotational speed NE during shifting of the transmission 14, and then the determination gear signal ESc is changed from the second gear, set till then, to the third gear.

In this way, even when the gear instruction signal Sc is changed from the second gear to the third gear at time t1, the determination gear signal ESc is maintained at the second gear. At the time (time t3) when it is determined that the engine rotational speed NE has changed by a degree to which the driver can recognize a variation in engine rotational speed NE, the determination gear signal ESc is changed to the third gear that is the same as the gear indicated by the gear instruction signal Sc.

Figure 6A:
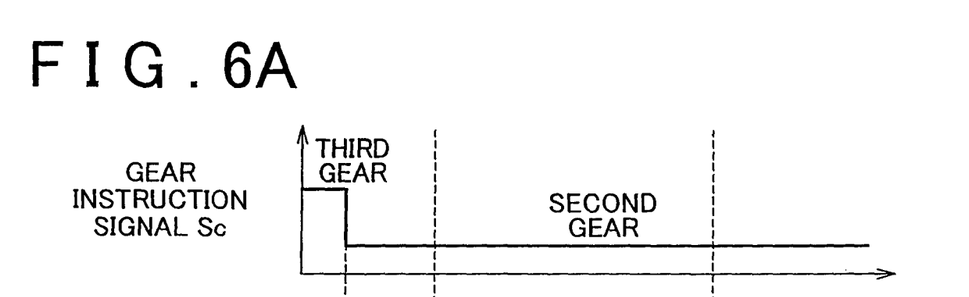
FIG. 6A to FIG. 6D are time charts that shows an example of a control mode of the fuel-saving drive recommendation system when the automatic transmission downshifts.
Figure 6B:
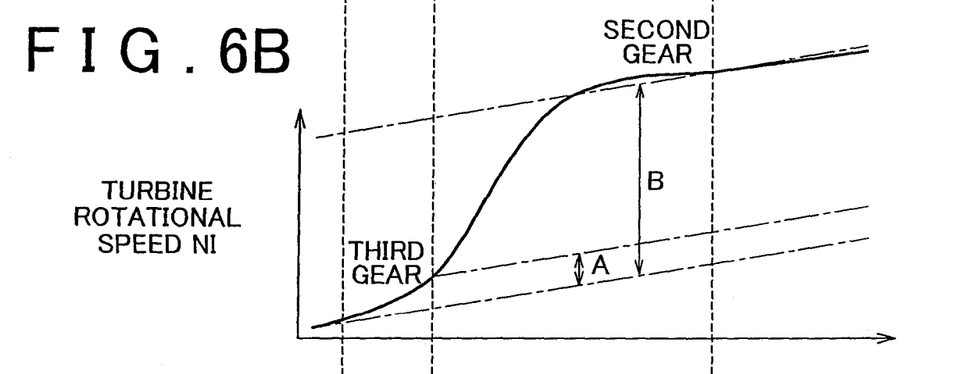
Figure 6C:
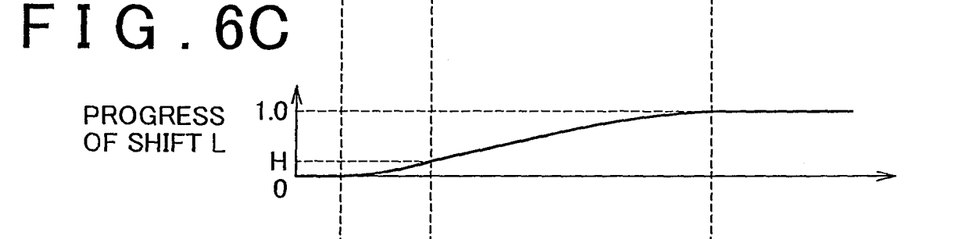
Figure 6D:
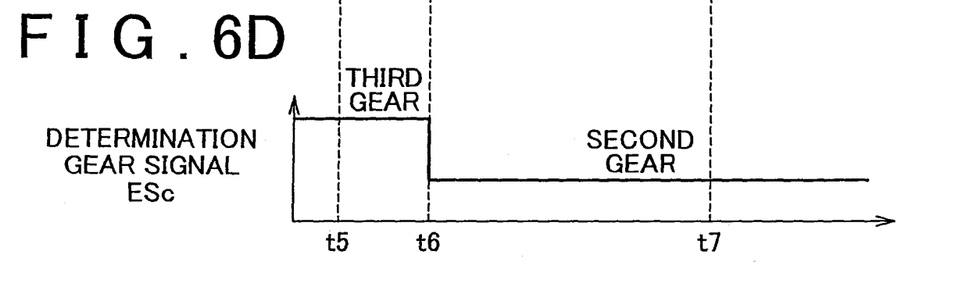

Incidentally, the above described period from time t2 to time t4 is a period during which the ratio between the input shaft rotational speed and output shaft rotational speed of the transmission 14 varies, that is, so-called inertia phase. In addition, as shown in FIG. 6A, when the gear instruction signal Sc is changed from the third gear to the second gear (time t5), shift operation of the transmission 14 is started, and the clutch mechanism and brake mechanism of the transmission 14 are operated to start establishing the post-shift gear. Then, the engine rotational speed NE is started to be regulated in order to make the pre-shift turbine rotational speed NI coincide with the synchronous speed NId corresponding to the post-shift second gear. By so doing, the turbine rotational speed NI gradually increases, and a shift is completed when the turbine rotational speed NI is synchronized with the synchronous speed NId at time t7. During a period from time t5 to time t7, the first speed difference A gradually increases with an increase in turbine rotational speed NI, and the progress of shift α also gradually increases. Then, in a period from time t5 to time t7, when the progress of shift α reaches the determination value H (time t6), it is determined that the engine rotational speed NE has changed by a degree to which the driver can recognize a variation in engine rotational speed NE during shifting of the transmission 14, and then the determination gear signal ESc is changed from the third gear, set till then, to the second gear.

In this way, even when the gear instruction signal Sc is changed from the third gear to the second gear at time t5, the determination gear signal ESc is maintained at the third gear. At the time (time t6) when it is determined that the engine rotational speed NE has changed by a degree to which the driver can recognize a variation in engine rotational speed NE, the determination gear signal ESc is changed to the second gear that is the same as the gear indicated by the gear instruction signal Sc.

Incidentally, the above described period from time t5 to time t7 is a period during which the ratio between the input shaft rotational speed and output shaft rotational speed of the transmission 14 varies, that is, so-called inertia phase. Next, the function obtained from the fuel-saving drive recommendation system 11 according to the present embodiment will be described.

While the driver is driving the vehicle, the fuel-saving drive recommendation system 11 determines the running state of the vehicle for fuel saving and then outputs the result to the display unit 28. At this time, the display unit 28 (notification unit) indicates a degree to which the determination required driving force EFd deviates from the required driving force recommendation region to thereby notify the driver whether the current running state of the vehicle is a fuel-saving drive state. Therefore, the driver visually identifies the display unit 28 of the display device 16 to thereby make it possible to recognize whether fuel-saving drive is performed, and it is possible to perform fuel-saving drive using the result indicated by the display unit 28 as an index.

Here, when the transmission 14 is shifted while the vehicle is driving, the determination gear signal ESc is changed while the input shaft rotational speed (turbine rotational speed NI) of the transmission 14 is varying after the gear instruction signal Sc is changed. By so doing, the determination required driving force EFd calculated by the shift control ECU 15 changes. Then, while the input shaft rotational speed of the transmission 14 is varying, that is, after the engine rotational speed NE starts to vary, the eco indicator determination unit 17 compares the determination required driving force EFd, which is changed in correspondence with the post-shift gear, with the required driving force recommendation region, and then indicates the result by the display unit 28. Therefore, after the driver at least starts experiencing a variation in engine rotational speed NE, the number of segments 28a turned on in the display unit 28 increases or decreases. In this way, when the transmission 14 shifts gears, indication of the display unit 28 changes with a variation in engine rotational speed NE. Thus, when the transmission 14 shifts gears, it is possible to suppress occurrence of a phenomenon that indication of the display unit 28 changes prior to a variation in engine rotational speed NE. This can suppress occurrence of inconvenience that the above phenomenon makes the driver experience an uncomfortable feeling.

In addition, the fuel-saving drive recommendation system 11 calculates the determination required driving force EFd corresponding to the required driving force of the vehicle driver on the basis of the above described parameters. The thus calculated value of the determination required driving force EFd becomes a value that further conforms to engine output, that is, a value that further conforms to fuel consumption. Thus, according to the present embodiment in which determination for fuel-saving drive is made on the basis of the determination required driving force EFd, in comparison with the case where determination for fuel-saving drive is made on the basis of the accelerator operation amount, or the like, it is possible to further improve the accuracy of determination for fuel saving.

With the above embodiment, the following advantageous effects may be obtained.

(1) In addition to the output control required driving force Fd for performing output control on the engine, the determination required driving force EFd is separately calculated for determining whether it is a fuel-saving drive state as the required driving force that is calculated on the basis of an amount by which the accelerator pedal is operated by the driver and a variable gear of the transmission 14. Then, the gear instruction signal Sc, which is an instruction value for changing the gear, is used as a parameter that indicates the gear necessary for calculating the output control required driving force Fd. By so doing, it is possible to regulate the engine rotational speed in order to regulate the input shaft rotational speed of the transmission 14 in accordance with the start of a shift.

On the other hand, the determination gear signal ESc different from the above gear instruction signal Sc is used as a parameter that indicates a gear necessary for calculating the determination required driving force EFd. The determination gear signal ESc is changed after a certain delay period so as to coincide with the gear instruction signal Sc during a period from the change of the gear instruction signal Sc to the end of a shift. Therefore, after the gear instruction signal Sc is changed, the determination gear signal ESc is changed after a delay. Thus, when the transmission 14 shifts gears, first, the output control required driving force Fd initially varies and then the determination required driving force EFd also varies after a delay. Therefore, the determination required driving force EFd, which is the required driving force for determining whether it is a fuel-saving drive state, may be varied after the gear instruction signal Sc is changed and then the input shaft rotational speed of the transmission 14 begins to vary, that is, after the engine rotational speed NE begins to vary. Thus, after the engine rotational speed NE begins to vary, the result of determination for fuel-saving drive changes. By so doing, it is possible to suppress an uncomfortable feeling experienced by the driver when the transmission 14 shifts gears.

(2) The engine rotational speed NE varies with the progress of shift during shifting of the transmission 14. Then, the determination gear signal ESc is changed on the basis of the progress of shift α. By so doing, the determination gear signal ESc is favorably changed.

(3) The progress of shift α may be estimated on the basis of an elapsed time from when the gear instruction signal Sc is changed. However, the transmission 14 has various modes, such as a power mode in which shift control that places importance on driving force is performed and an economy mode in which shift control that places importance on fuel economy is performed. In the transmission 14 in which shift modes are switched in this way, a movement of the input shaft rotational speed of the transmission 14, that is, a movement of the turbine rotational speed NI, during a period from when the gear instruction signal Sc is changed to when a shift is completed is not uniform but different between shift modes. In addition, a movement of the input shaft rotational speed (turbine rotational speed NI) also changes because of aged degradation of the transmission 14, or the like. Therefore, when the progress of shift α is estimated on the basis of the elapsed time, there is a possibility that the input shaft rotational speed of the transmission 14 (turbine rotational speed NI) at the time when the determination gear signal ESc is changed varies by shift modes or deviates because of aged degradation, or the like.

In terms of this point, in the above embodiment, a degree to which the actual input shaft rotational speed (turbine rotational speed NI) reaches the synchronous speed NId that is the input shaft rotational speed (turbine rotational speed NI) of the transmission 14, corresponding to the post-shift gear, is calculated as the progress of shift α. The determination gear signal ESc is changed on the basis of the calculated progress of shift α. Therefore, it is possible to suppress the influence of the above described shift modes, aged degradation, or the like, on the input shaft rotational speed of the transmission 14 (turbine rotational speed NI) as much as possible when the determination gear signal ESc is changed. Thus, when the result of determination for fuel-saving drive changes with the change of the determination gear signal ESc, the input shaft rotational speed (turbine rotational speed NI) at the time when the result of determination changes is almost constant. By so doing, it is possible to stably suppress an uncomfortable feeling experienced by the driver.

(4) The progress of shift α is obtained as follows. First, the first speed difference A is calculated. The first speed difference A is a difference between the input shaft rotational speed (start-shift turbine rotational speed NIs) at the start of a shift and the actual value of the input shaft rotational speed (turbine rotational speed NI) during shifting. By calculating the first speed difference A, a variation in input shaft rotational speed (turbine rotational speed NI) from the start of a shift to the current point in time is calculated.

In addition, the second speed difference B is calculated. The second speed difference B is a difference between the input shaft rotational speed at the start of a shift (start-shift turbine rotational speed NIs) and the synchronous speed NId at the end of a shift. By calculating the second speed difference B, a variation in input shaft rotational speed (turbine rotational speed NI) during a period from the start of a shift to the end of a shift is calculated.

Then, it is possible to calculate the progress of shift α by calculating the ratio of the first speed difference A to the second speed difference B. In addition, the determination gear signal ESc is changed at the time when the calculated progress of shift a has reached the determination value H, and the determination gear signal ESc is appropriately changed.

Note that it is possible to adjust the timing, at which the determination gear signal ESc is changed, only by changing the determination value H. Therefore, it is possible to easily optimize that change timing or expand and employ that change timing to other vehicle types.

(5) When the shift stage of the transmission 14 is in the above described inertia phase, that is, when the input shaft rotational speed (turbine rotational speed NI) of the transmission 14 is varying with shift operation, the determination gear signal ESc is changed. Thus, when the driver can recognize the change of the engine rotational speed NE, the determination gear signal ESc is changed. Therefore, it is possible to change the result of determination for fuel-saving drive at an appropriate timing. Incidentally, the inertia phase is formed by an instruction signal from the shift control ECU 15. Therefore, the above instruction signal is input to the fuel-saving drive recommendation system 11, so it is possible to easily determine whether the shift stage is in an inertia phase.

(6) Determination for fuel-saving drive is made on the basis of the determination required driving force EFd. Therefore, in comparison with the case where determination for fuel-saving drive is made on the basis of the accelerator operation amount, or the like, it is possible to further improve the accuracy of determination for fuel saving.

(7) Between the process in which the required driving force calculation unit 32 calculates the output control required driving force Fd and the process in which the driving force calculation unit 32 calculates the determination required driving force EFd, only a value used as a parameter that indicates the gear is different. That is, to calculate the determination required driving force EFd, the calculation sequence of the output control required driving force Fd is utilized. Thus, it is not necessary to prepare additional calculation sequence separately for calculating the determination required driving force EFd, and it is possible to calculate the determination required driving force EFd only by a simple program change. Therefore, in comparison with the case where additional calculation sequence is prepared, it is possible to suppress an increase in program capacity, complication of control, an increase in work time for constructing the calculation sequence of the determination required driving force EFd, or the like.

(8) The display unit 28 is provided to constantly indicate the result of determination for fuel-saving drive. When the display unit 28 is provided, the result of determination is constantly indicated, so it is highly likely to particularly make the driver experience the above described uncomfortable feeling. In terms of this point, with the present embodiment, even when the display unit 28 is provided, it is possible to suppress an uncomfortable feeling experienced by the driver during shifting of the transmission 14.

The above described embodiment may be modified into the following alternative embodiments. When the required driving force recommendation region R is calculated, a parameter related to a vehicle state or a parameter related to a running state may be considered in addition to the vehicle speed Vt.

An optimal required driving force recommendation region R is calculated on the basis of the vehicle speed Vt; instead, the required driving force recommendation region R may be a fixed value. A mode in which the driver is notified by the display unit 28 of the result of determination for fuel-saving drive may be appropriately modified. For example, in the above embodiment, bar-like indication is shortened, as the degree of deviation from fuel-saving drive increases. Instead, it is also applicable that bar-like indication is elongated as the degree of deviation from fuel-saving drive increases.

The parameter considered at the time of calculating the output control required driving force Fd or the determination required driving force EFd may be appropriately changed. The configuration of the notification unit that notifies the driver may be changed. For example, instead of the display unit 28 divided into the plurality of segments 28a, the notification unit may be formed of a single lamp. In this case, control is performed so that the lamp is turned on when the determination required driving force EFd falls within the required driving force recommendation region R, and the lamp is turned off when the determination required driving force EFd deviates from the required driving force recommendation region R. By so doing, it is possible to provide notification for recommending fuel-saving drive to the driver. In addition, instead of displaying the result of determination, the driver may be notified in sound.

The ratio of the first speed difference A to the second speed difference B is obtained as the progress of shift α; instead, the proportion of the first speed difference A to the second speed difference B may be obtained in another embodiment. For example, a value that is obtained by subtracting the first speed difference A from the second speed difference B (second speed difference B−first speed difference A) may be set as the progress of shift α. In this case, as the progress of shift of the transmission 14 increases, the subtracted value decreases.

Figure 7:
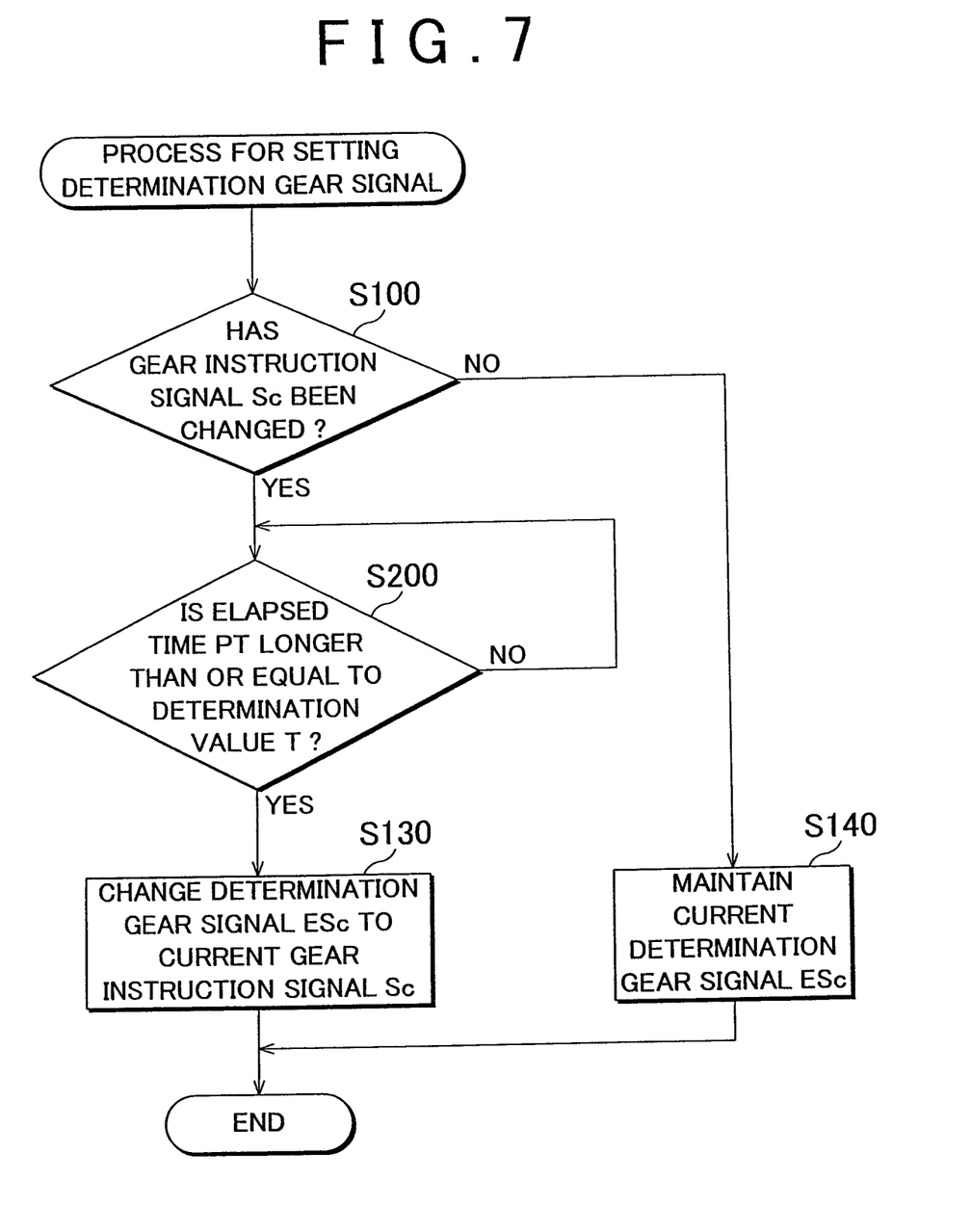
FIG. 7 is a flowchart that shows the procedure of process for setting a determination gear signal according to an alternative embodiment.

The timing, at which the determination gear signal ESc is changed, is determined on the basis of the progress of shift α; instead, the change timing may be determined in another embodiment. For example, as described above, the progress of shift may be estimated on the basis of an elapsed time from when the gear instruction signal Sc is changed. Then, it is applicable that a measuring unit, such as a timer, that measures an elapsed time from when the gear instruction signal Sc is changed, and the determination gear signal ESc is changed on the basis of the measured elapsed time. This alternative embodiment may be embodied in such a manner that, as shown in FIG. 7, the processes of step S110 and step S120 are omitted from the process for setting the determination gear signal illustrated in FIG. 4 and then the new process of step S200 is added. That is, when affirmative determination is made in step S100 (YES in S100), it is determined whether an elapsed time PT from when the gear instruction signal Sc is changed is longer than or equal to a determination value T (S200). The determination value T may be a value corresponding to a period of time required until the progress of shift α reaches the determination value H. Then, when the elapsed time PT is shorter than the determination value T (NO in S200), the determination process in step S200 is repeated until affirmative determination is made in step S200. On the other hand, when the elapsed time PT is longer than or equal to the determination value (YES in S200), the process of step S130, that is, the process for changing the value of the determination gear signal ESc to coincide with the value of the currently set gear instruction signal Sc, is executed. In the case of the alternative embodiment, the process for changing the determination gear signal ESc may be further simply configured.

The output operating component in the above embodiment is an accelerator pedal operated by a driver's foot; instead, it may be formed of another component. For example, the output operating component may be the one operated by a driver's hand.

The invention claimed is:

1. A fuel-saving drive recommendation system adapted to a vehicle that includes a step-gear automatic transmission of which a gear is shifted in response to a gear instruction signal and an internal combustion engine on which output control is performed on the basis of a required driving force that is calculated on the basis of an amount by which an output operating component is operated by a driver and a variable gear of the automatic transmission, the fuel-saving drive recommendation system comprising:
   a required driving force calculation unit that calculates, as the required driving force, an output control required driving force for performing output control on the engine and a determination required driving force for determining whether the vehicle is in a fuel-saving drive state, wherein the required driving force calculation unit uses the gear instruction signal as a parameter that indicates the gear when the output control required driving force is calculated, and uses a determination gear signal different from the gear instruction signal when the determination required driving force is calculated;
   a signal change unit that changes the determination gear signal so as to coincide with the gear instruction signal that has been changed;
   a determination unit that determines whether a running state of the vehicle is a fuel-saving drive state on the basis of the determination required driving force; and
   a notification unit that notifies a result of the determination.

2. The fuel-saving drive recommendation system according to claim 1, wherein the signal change unit changes the determination gear signal on the basis of a progress of shift during shifting of the automatic transmission.

3. The fuel-saving drive recommendation system according to claim 2, further comprising:
   an input shaft rotational speed detecting unit that detects an input shaft rotational speed of the automatic transmission;
   a synchronous speed calculation unit that calculates a synchronous speed of the input shaft rotational speed, corresponding to a post-shift gear, when the automatic transmission shifts gears; and
   a shift progress calculation unit that calculates a degree to which the input shaft rotational speed detected during shifting of the automatic transmission reaches the synchronous speed as the progress of shift of the automatic transmission, wherein the signal change unit changes the determination gear signal on the basis of the progress of shift calculated by the shift progress calculation unit.

4. The fuel-saving drive recommendation system according to claim 3, wherein the shift progress calculation unit calculates a first speed difference that is a difference between the input shaft rotational speed at the start of a shift and an actual value of the input shaft rotational speed during shifting, calculates a second speed difference that is a difference between the input shaft rotational speed at the start of a shift and the synchronous speed at the end of a shift, and calculates a proportion of the first speed difference to the second speed difference as the progress of shift, and the signal change unit changes the determination gear signal when the progress of shift has reached a predetermined determination value.

5. The fuel-saving drive recommendation system according to claim 1, further comprising:
a measuring unit that measures an elapsed time from when the gear instruction signal is changed, wherein the signal change unit changes the determination gear signal on the basis of the elapsed time measured by the measuring unit.

6. The fuel-saving drive recommendation system according to claim 5, wherein the signal change unit changes the determination gear signal when a shift stage of the automatic transmission is in an inertia phase.

7. A fuel-saving drive recommendation method adapted to a vehicle that includes a step-gear automatic transmission of which a gear is shifted in response to a gear instruction signal and an internal combustion engine on which output control is performed on the basis of a required driving force that is calculated on the basis of an amount by which an output operating component is operated by a driver and a variable gear of the automatic transmission, the fuel-saving drive recommendation method comprising:
calculating, as the required driving force, an output control required driving force for performing output control on the engine and a determination required driving force for determining whether the vehicle is in a fuel-saving drive state, wherein the gear instruction signal is used as a parameter that indicates the gear when the output control required driving force is calculated, and a determination gear signal different from the gear instruction signal is used when the determination required driving force is calculated;
changing the determination gear signal so as to coincide with the gear instruction signal that has been changed;
determining whether a running state of the vehicle is a fuel-saving drive state on the basis of the determination required driving force; and
notifying a result of the determination.

* * * * *